(No Model.) 3 Sheets—Sheet 1.

F. H. VAN HOUTEN.
MOLDING MACHINE.

No. 435,336. Patented Aug. 26, 1890.

Witnesses
Fred J. Church
Thomas Durant

Inventor
Frank H. Van Houten
by Church & Church
His Attorneys

THE NORRIS PETERS CO., PHOTO-LITHO., WASHINGTON, D. C.

(No Model.)
3 Sheets—Sheet 2.

F. H. VAN HOUTEN.
MOLDING MACHINE.

No. 435,336. Patented Aug. 26, 1890.

Witnesses
Fred F. Church
Thos. Durant

Inventor
Frank H. Van Houten
by Church & Church
His Attorneys (No Model.) 3 Sheets—Sheet 3.
F. H. VAN HOUTEN.
MOLDING MACHINE.
No. 435,336. Patented Aug. 26, 1890.
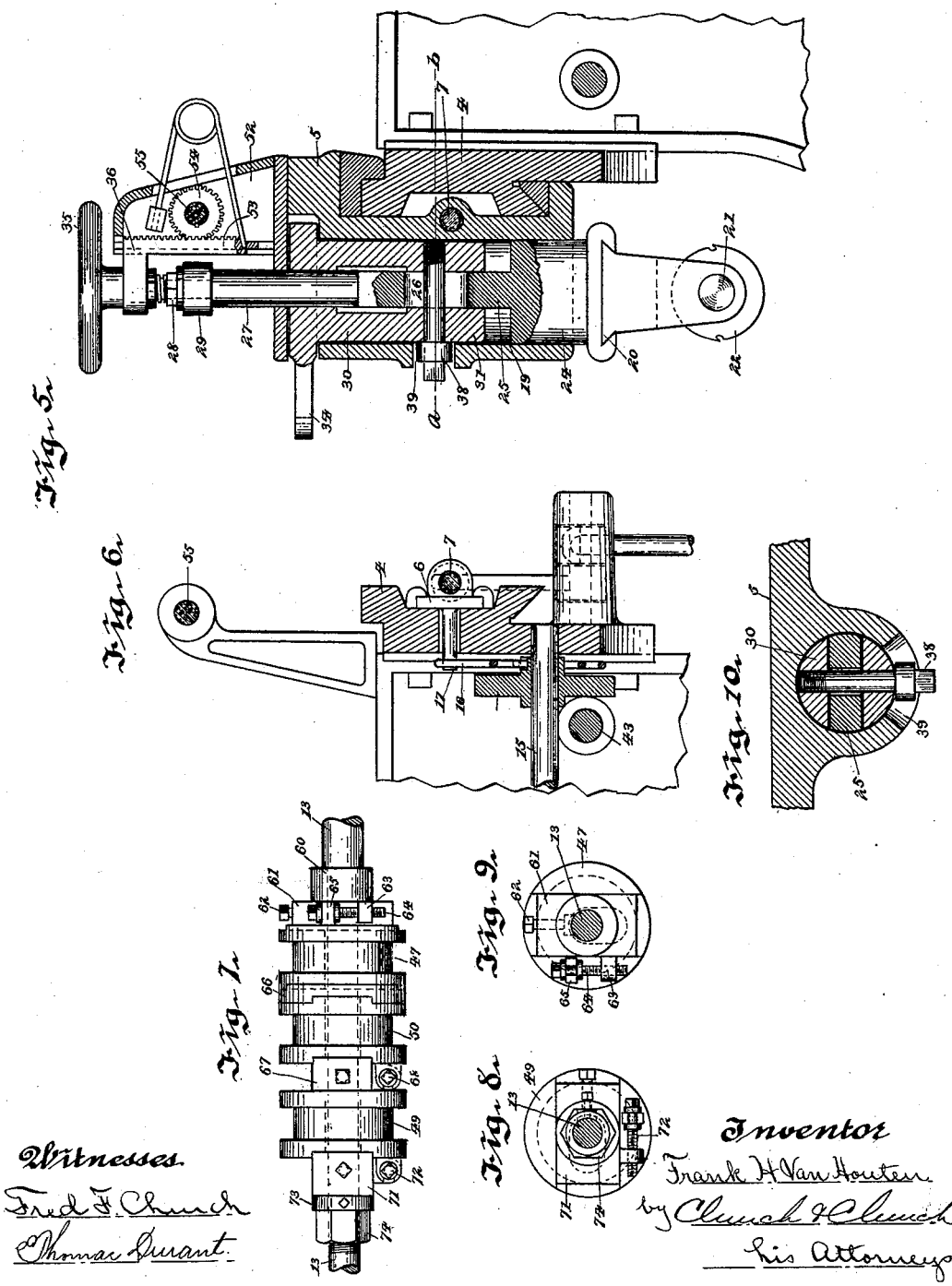
Witnesses.
Fred F. Church
Thomas Durant
Inventor
Frank H. Van Houten
by Church & Church
his Attorneys

UNITED STATES PATENT OFFICE.

FRANK H. VAN HOUTEN, OF MATTEAWAN, NEW YORK, ASSIGNOR TO CHARLES L. GOEHRING, OF ALLEGHENY, PENNSYLVANIA.

MOLDING-MACHINE.

SPECIFICATION forming part of Letters Patent No. 435,336, dated August 26, 1890.

Application filed December 12, 1889. Serial No. 333,414. (No model.)

*To all whom it may concern:*

Be it known that I, FRANK H. VAN HOUTEN, of Matteawan, county of Duchess and State of New York, have invented certain new and useful Improvements in Molding-Machines; and I do hereby declare the following to be a full, clear, and exact description of the same, reference being had to the accompanying drawings, forming a part of this specification, and to the figures and letters of reference marked thereon.

My present invention relates to improvements upon the apparatus or form of mechanism disclosed in patents, Nos. 394,764 and 394,765, granted December 18, 1888, to Charles L. Goehring, and constituting a part or portion of the main system described in Patent No. 394,763; and my said invention consists in the novel and improved combination and arrangement of the devices for affecting the oscillations of the arbor about its pivotal point of support and their co-operative relations with other parts of the system, as hereinafter described, and pointed out in the claims.

Figure 2:
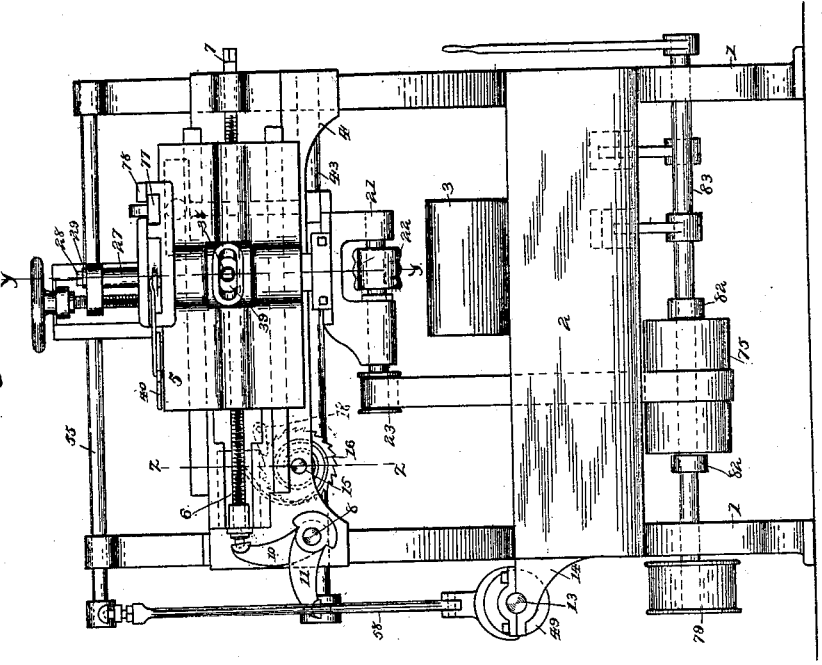
Figure 1:
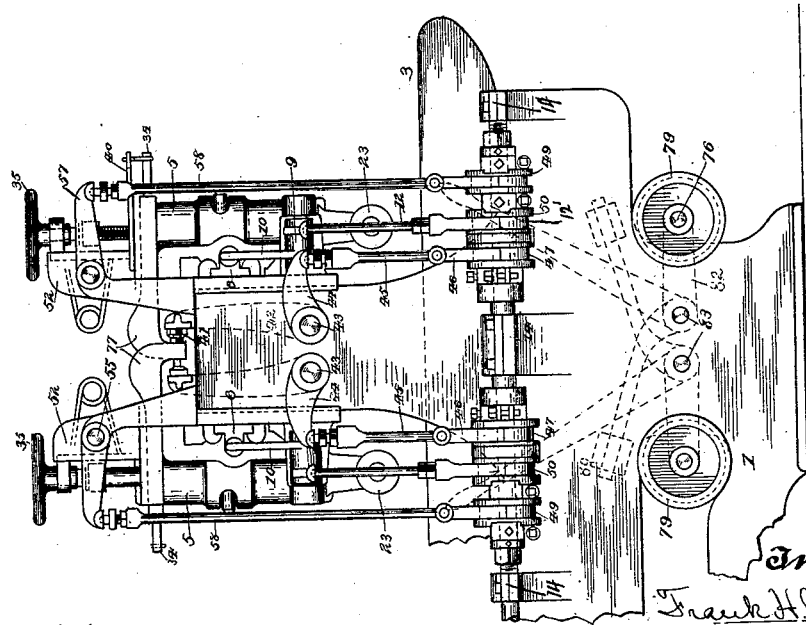
Figure 3:
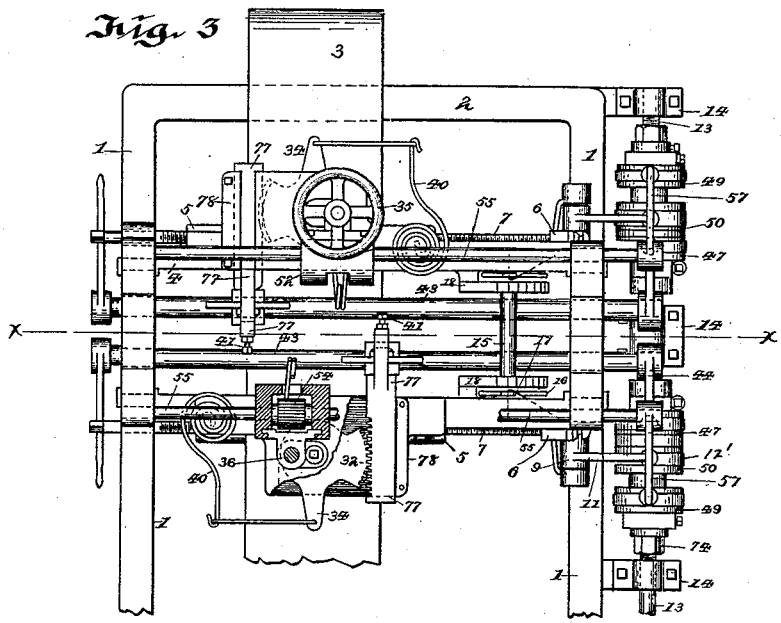
Figure 4:
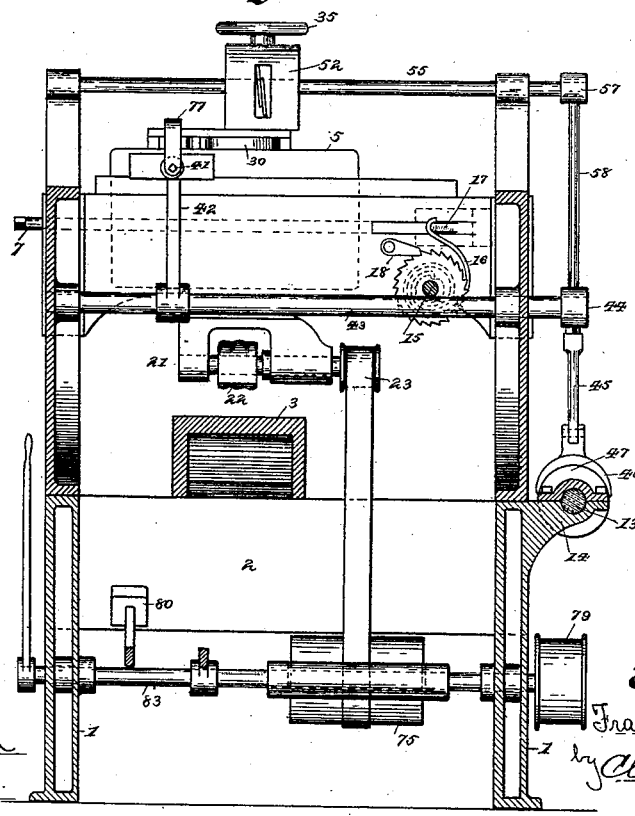

In the accompanying drawings, Figure 1 is a side elevation of a portion of a machine, showing my present invention; Fig. 2, an end view of the same; Fig. 3, a top plan view; Fig. 4, a section taken on the line $x\ x$ of Fig. 3; Fig. 5, a section on the line $y\ y$ of Fig 2; Fig. 6, a section on the line $z\ z$ of Fig. 2; Fig. 7, a detail of the series of adjustable cams for operating the various movable portions; Figs. 8 and 9, views of opposite ends of said series of cams, and Fig. 10 a section on the line $a\ b$ of Fig. 5.

Similar numerals of reference in the several figures indicate similar parts.

My present invention and improvements as applied and used in connection with the molding-machine described in said prior patents relate more especially to the construction of and the means for effecting and controlling the oscillations of the cutter-head, operating separately or in conjunction with devices for reciprocating said cutter-head laterally or vertically, or simultaneously in both of said directions with respect to the line of movement of the material or board operated upon. As described and illustrated in said patents, the board or other material operated upon is fed or advanced positively and continuously in a right line, and the several cutting mechanisms are so connected to the driving mechanism that their controlling devices shall at all times be caused to move in unison with the feed-controlling devices and at a speed proportional to the latter.

The particular variety of cutting mechanism to which this invention more particularly has reference is that employed for producing the ornamental or other designs upon the face or horizontal surface of the material, the various movements, and more especially the transverse reciprocations and oscillating movements of the cutter-head, being timed and proportioned to correspond with the reciprocations of the edging-cutter or those producing the general outline of the edges of the board.

For a more detailed description of the other co-operating elements reference is made to the before-mentioned patents and to my pending application, Serial No. 329,747, filed November 9, 1889. In the previous patents referred to the oscillating arbors have been arranged in pairs in order to produce the complete designs, one being operated from each side of the bed-plate or work-support; but this arrangement has necessitated the employment of a cam-shaft on each side of the machine and more or less complicated gearing; but in the present device I not only provide for the employment of a single shaft, as in my before-mentioned application, (this application embodying a construction of the machine shown in said prior one,) but also provide an improved construction of arbor supporting and oscillating frame.

The portion of the main frame herein shown consists of the sides 1 1, connected by suitable braces or cross-pieces 2, on which a bed-plate or work-support 3 is secured in any suitable manner.

Secured to the upper portion of the frame are upright castings connected by suitable bars or castings 4 4, having ways thereon, on which the frames or carriages carrying the arbors are located. In the present construction I have shown two adjustable carriages—one for each of the co-operating cutter-heads—and prefer to mount them upon the same uprights, as shown; but they are in all respects the same as far as construction is concerned, except as to being "rights and lefts," and located on opposite sides of the bed-plate and forward and in rear of the connected side pieces of the frame, and therefore a description of one will apply to both.

The carriage is preferably constructed in two parts, the one 5, upon which the arbor-frame is mounted, and the other 6, sliding on guides on the way and connected to the former by a threaded rod or shaft 7, turning loosely in part 6 and screwing through a nut or threaded portion on the rear of the carriage, its end being extended outward to the side of the machine, where it is squared for the application of a wrench or handle, whereby it may be turned and the position of the two parts relatively adjusted, as may be desired.

Secured in the frame is a stationary shaft 8, upon the end of which is journaled a rocking sleeve 9, having arms 10 11 thereon, constituting a bell-crank lever, and the end of each of these arms is preferably recessed to co-operate, the one 10 with the end of the screw 7 or a portion of the carriage 6, while the other end is operated upon by a vertical connecting-rod 12, having a yoke or strap 12' at its lower end, embracing and being reciprocated by a cam 50, arranged upon a suitable shaft 13, supported in suitable bearings 14 in the frame.

Mounted loosely upon the shaft 15 is a ratchet-wheel connected to one end of a volute spring 16, the other end of which presses against a projection 17 on the carriage, (see Fig. 6,) said spring operating the carriage in a direction to hold the rod 12 down in contact with the cam and to move the carriage outward, while the cam will cause its movement inward, thus providing for the lateral motions of the frame. In order to tighten the spring it is only necessary to rotate the ratchet-wheel, a pawl 18 co-operating therewith preventing its backward rotation. The portion 6 of the carriage is provided with a vertical bearing or recess 19, in which the arbor-frame oscillates, and the latter is preferably constructed in two parts 20 and 30, constituting in effect a vertical spindle, in the lower end of which the arbor is mounted, said arbor standing transversely of the axis of the spindle. The lower portion 20 of said frame contains the arbor 21, with the cutter-head 22 and pulley 23 thereon, and above this is provided the cylindrical portion 24, fitting the recess 19, the rectangular portion 25, having the aperture 26, and the vertical rod or extension 27.

The portion 30 of the arbor-frame is provided with the round lower part 31, fitting recess 19, the central recess in which the upper part of section 20 fits, and the lateral flange 32, having gear-teeth on its edge, constituting a segment. The lower portion of the central recess in section 30 is shaped to conform to the rectangular form of part 25 of section 20, and the flange 32 constitutes its support. The extension 27 of the portion 20 is provided at the upper end with a shoulder, between which and a nut 28, fitting on the reduced end, is one end of a plate 29, the other end of said plate having a threaded aperture, through which passes a screw 34, having a hand-wheel 35, and supported to turn freely in a bracket 36, located upon the carriage and either connected rigidly thereto or adjustable thereon, as hereinafter described. A bolt 38 extends through the lower part of the upper section of the arbor-frame, the slot 26 in the lower section being provided for its accommodation, and its head extends out through a slot 39 in the frame 6, as shown, for convenient manipulation from the outside.

The lower part of the arbor-frame can readily be adjusted vertically by means of the hand-wheel 35, raising or lowering the cutter-head, as may be desired, to suit various thicknesses of material, and the necessary oscillating movement can be given it by oscillating the upper section 30, as hereinafter described. After the proper adjustment is secured the parts may be locked together.

Formed upon or secured to the flange 32 of the upper section of the arbor-frame is an arm 34, to which is connected one end of a volute spring 40, its other end being connected to a ratchet-wheel on the carriage 6, locked by a pawl, (not shown,) in the same manner as the winding device of the spring for moving the carriage. The segment on plate 32 engages with a rack 77, held between it and an abutment 78 on the frame 6, the end of said rack being bent over and provided with an adjustable screw or abutment 41, which bears against a lever 42, attached to a rock-shaft 43, journaled in the frame, and provided on its outer end with an arm or lever 44, having a cup-shaped end, into which projects one end of rod or bar 45, having the strap or yoke 46 on the end in engagement with the cam 47 on the cam-shaft. The end of lever 42, it will be noted, is extended laterally, so that the end of the rack will remain in engagement with it, notwithstanding the lateral movement given the whole carriage. As thus constructed, it will be seen the head is oscillated positively in one direction by the spring and in the other by the cam, the arrangement of the cam relative to the cam of the other arbor-frame and to the speed of the feeding devices of course regulating the pattern.

It is oftentimes desirable to give the cutter-heads a vertical as well as an oscillatory and lateral movement in order to form elaborate patterns, and as a convenient and simple means of accomplishing this, instead of making the bracket 36 stationary upon the carriage, I prefer to make it movable thereon and to regulate its movements by a cam, as are the other parts.

The bracket 36 is provided on its rear edges with guides entering corresponding recesses in the casting 52, secured to the top of the carriage, and on its rear side is formed a rack 53, with which engages a gear 54, splined upon a shaft 55, mounted on bearings in the frames 2 2, said gear being capable of independent longitudinal movement on said shaft. A spring 56 has one end secured to the casting 52, while the other enters a recess in the rear side of ratchet 36 and normally tends to press said bracket and the whole arbor-frame downward toward the work.

The shaft 55, to which the gear 54 is splined, is, as stated, journaled in the side frames, and on one end is provided with an arm or lever 57, provided with the before-mentioned cup-shaped end, with which co-operates one end of a connecting thrust-rod 58, provided at the lower end with a yoke or strap resting upon the cam 49 on the cam-shaft and adapted to be raised and lowered thereby, causing the turning of shaft 55 and the raising of the arbor-frame, the reverse movement being caused by the weight of the parts and the spring 56, as will be understood.

As the cams 47 49 50 are all adjustable on shaft 13 in a manner farther on described, it will be seen that by adjusting cam 50, so that it is concentric with the shaft, there will be no vertical movement of the thrust-rod, and consequently no vertical movement of the cutter-head, and when this is desired I prefer to clamp the two parts of the arbor-frame together by the clamping-bolt 38, as described. By making the arbor-frame in two telescoping sections and giving them both a bearing in the carriage, I make the parts stronger and better adapted to withstand the high speeds and shocks to which the parts may be subjected, and, furthermore, the parts are much simplified.

The shaft 13, upon which the operating-cams are located, extends through from the rear end of the machine, and, being supported at the forward end in three broad bearings, is well calculated to bear the weight of the parts by the thrust of the yokes or straps on the cams, and by the arrangements shown the parts are not only simplified but both oscillating arbors are governed from the same side of the machine.

In Figs. 7, 8, and 9 are shown views of the cams and the shaft on which they are mounted. The shaft 13 is preferably provided with a collar or abutment 60, and next to this is placed a block or plate 61, having an aperture fitting the shaft, and a set-screw 62 for holding it in position, and upon one side a lug 63, threaded for the accommodation of a screw 64, carried by an open lug 65 on the side of the cam 47, and the cam is provided with an elongated recess (shown in dotted lines, Fig. 9,) so that by adjusting the screw the degree of eccentricity of the cam can be adjusted or changed as desired.

Between the cams 47 and 50 is placed a suitable disk or plate 66, having on opposite sides grooves, in which corresponding tongues on the two cams enter, said grooves being arranged at right angles and preventing the possibility of the two cams turning relative to each other and permitting their adjustment only at right angles. The plate 67, from which the cam 50 is adjusted by means of the screw 68 engaging similar lugs, is arranged on the opposite or outer side of the cam, as shown; but the outer side of this block is not let into the next cam or disk 49; but the latter may be adjusted in any direction on the shaft by means of the block 71 and adjusting-screw 72, similar in all respects to the others. Next this plate 70 is arranged a washer or collar 73, having a set-screw therein, and beyond this a nut 74, screwed directly upon the shaft and capable of being screwed up and tightly clamping all the cams and blocks between it and the collar 60 arranged or formed thereon. The cams can thus be freely arranged and adjusted relative to each other and the feeding devices of the machine, so as to vary or make any desired pattern of molding desired, as will be readily understood.

While I have shown both of the arbor-frames operated from the single shaft, and for many reasons prefer this arrangement, I do not desire to be confined to this structure.

The oscillating cutter-head in the present form of machine is driven from a drum 75 on a shaft 76, supported on the ends of arms 82 on a shaft 83, said shaft 76 being provided with a driving-pulley 79 on its end, as shown, and a counter-weight 80 is mounted on an arm connected to shaft 78, so as to keep the belt tight at all times and also permit the drum 75 to move upward when the belt to the cutter-arbor is shortened by the oscillations of the latter.

The arrangement of parts of the two arbor-frames are, as stated, the same, except that they are located on opposite sides of the work-support, as in Fig. 3, and I do not deem it necessary to describe in detail the operation of the parts, as the before-mentioned patents clearly describe the necessary operations, and the operations of the improvements herein shown will be readily apparent to one skilled in the art.

I claim as my invention—

1. The combination, with the laterally-reciprocating slide or carriage, of an oscillatory arbor-frame carrying an arbor and cutter-head and adjustable vertically on the carriage, substantially as described.

2. The combination, with the laterally-reciprocating slide or carriage, of an oscillatory arbor-frame carrying an arbor and cutter head and movable vertically on the carriage, and a cam for controlling said vertical movement, substantially as described.

3. The combination, with the carriage or slide and the laterally-extending way on which it operates, of an arbor-frame mounted on the carriage, formed in two sections, movable longitudinally the one upon the other, one section carrying an arbor and cutter-head and the other capable of oscillating on the carriage, substantially as described.

4. The combination, with the carriage or slide and the laterally-extending way on which it operates, of a telescoping arbor-frame mounted on the carriage, one section carrying an arbor and cutter-head and the other capable of oscillating on the carriage, a cam for causing the oscillation of said last-mentioned section, and a cam for causing the movement of the carriage on the way, substantially as described.

5. The combination, with a bed-plate or work-support, an overhanging laterally-extending guide or way, and a carriage or slide movable thereon, of an oscillatory arbor-frame carrying an arbor and cutter-head vertically adjustable on the carriage, and cams for causing lateral movement of the carriage and the oscillatory movement of the arbor-frame, substantially as described.

6. The combination, with an arbor-support having vertical bearing therein, of an arbor-frame constructed in two vertically-telescoping sections, one carrying an arbor and cutter-head and the other having a segment thereon, a rack co-operating with said segment, and a cam actuating said rack for causing the oscillation of the arbor, substantially as described.

7. The combination, with the reciprocating carriage or slide having a vertical bearing therein, of an arbor-frame constructed of two vertically-telescoping sections, one carrying an arbor and cutter-head and the other having a segment thereon, a rack co-operating with said segment, a lever mounted in stationary bearings having a laterally-extended portion co-operating with the rack, and a cam controlling the movements of said lever, substantially as described.

8. The combination, with the slide or carriage having the vertical bearing, of an arbor-frame constructed of two vertically-telescoping sections, one carrying an arbor and cutter-head having the extension and the adjusting-screw connected thereto and the other section having the bearing in the carriage, and a cam for oscillating said last-mentioned section on the carriage, substantially as described.

9. The combination, with the slide or carriage having the vertical bearing, of an arbor-frame carrying an arbor and cutter-head, a segment thereon, a spring for actuating the frame in one direction, a rack co-operating with the segment, and a cam for operating the segment and rack against the spring, substantially as described.

10. The combination, with the reciprocating carriage or slide, of the telescoping arbor-frame thereon, one section held in a vertical bearing in the carriage and adapted to be oscillated therein and the other section carrying an arbor and cutter-head, a rack connected to said last-mentioned section, a gear operating therein, a shaft to which the gear is splined mounted in stationary bearings, and cams for oscillating the arbor-frame and rotating the shaft to raise and lower the arbor and cutter-head, substantially as described.

11. The combination, with the laterally-movable slide or carriage and the telescoping oscillatory arbor-frame mounted thereon on a vertical axis, of a single shaft having three cams thereon, connections between one cam and the carriage, connections between another cam and one section of the arbor-frame so as to oscillate the same, and connections between the other cam and the other section of the arbor-frame, causing the vertical movement of the arbor and cutter, substantially as described.

12. The combination, with the frame, the transverse guide or way, the carriage or slide mounted thereon, a ratchet-wheel mounted on the guide, a pawl for locking it, and a spring connected to the wheel and operating the carriage in one direction, of a cam for actuating the carriage against the tension of the spring, substantially as described.

13. The combination, with the arbor-frame formed in two telescoping sections, one adapted to be rotated and the other having the extension, of the plate loosely pivoted to the extension, the screw and hand-wheel co-operating with the plate, and the bracket supporting the screw, substantially as described.

14. The combination, with the shaft and two cams adjustable thereon, of a block or disk arranged between said cams having interlocking projections on both sides preventing the independent adjustment of the cams save at right angles, substantially as described.

15. In a machine such as described, the combination, with the work-support and a frame or way bridging said support, of a slide or carriage mounted upon said support and movable laterally of the direction in which the material is fed, a vertical spindle mounted in bearings in said support, devices for oscillating said spindle, a rotating arbor supported in bearings on and with its axis lying in a plane transverse to the axis of the spindle, and a cutter-head secured to the arbor in line with the spindle, substantially as described.

FRANK H. VAN HOUTEN.

Witnesses:
FRED F. CHURCH,
C. D. KIEHEL.